3,529,851
CONTROL DEVICE
Eugene W. Hines, 5650 Saline-Ann Arbor Road,
Saline, Mich. 48176
Filed Oct. 7, 1968, Ser. No. 765,401
Int. Cl. B62d 53/08
U.S. Cl. 280—432          10 Claims

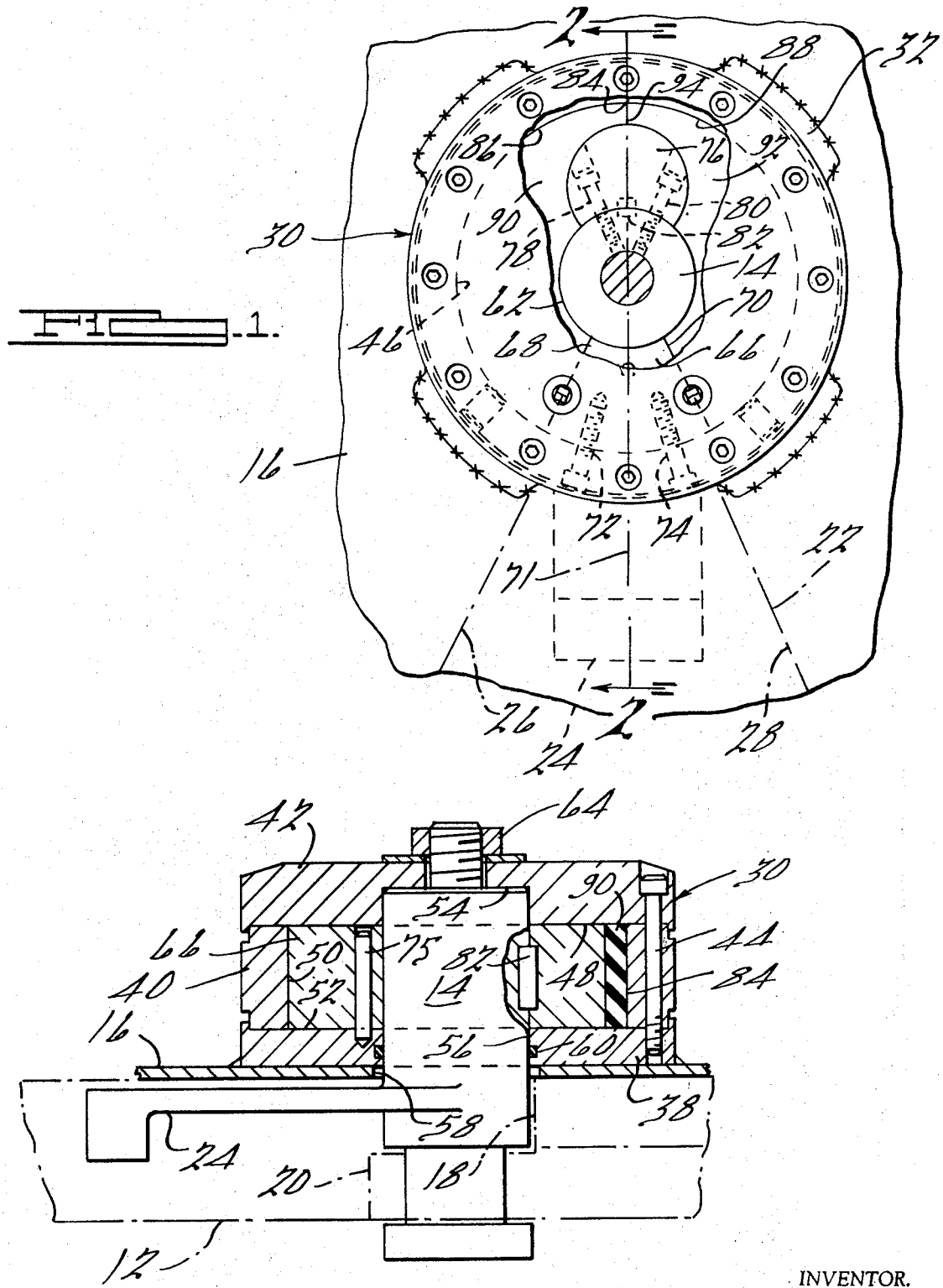

ABSTRACT OF THE DISCLOSURE

There is herein disclosed a control device for resisting the sudden transmission of large forces through a coupling between relatively movable members comprising a solid relatively incompressible resilient elastic flowable natural or synthetic rubber or rubber-like material.

BACKGROUND AND SUMMARY OF INVENTION

In general, this invention relates to a control device for resisting sudden applications of large forces and more particularly to an improvement in stabilizing units of the type disclosed in U.S. Pat. No. 2,170,898. In the present invention, a solid relatively incompressible resilient elastic flowable material is confined in a variable volume chamber and caused to flow from the chamber under load through a restricted passage whereby the amount of resistance provided by the device is directly and inversely proportional to the amount of force applied and the rate of application of that force.

DRAWING

FIG. 1 is a plan view, partly schematic and with parts broken away, showing a control device of the present invention in combination with portions of a tractor-trailer unit; and FIG. 2 is a cross-sectional side elevational view of the apparatus of FIG. 1.

DETAILED DESCRIPTION

Referring now to the drawing, the inventive principles are embodied in a tractor-trailer hitch comprising the conventional components of a fifth wheel unit 12, shown schematically in FIG. 2, on the tractor (otherwise not shown) and a kingpin connecting unit 14 centrally mounted in a wear plate 16 fixed on the trailer (otherwise not shown). The fifth wheel unit includes a kingpin socket 18 and a locking hook 20 also shown schematically in FIG. 2. An outwardly flaring slot 22 extends from the socket 18, as shown schematically in FIG. 1, and cooperates with a control arm means 24 attached to the kingpin 14 and being located between the sides 26, 28 of the slot 22. Thus, as the tractor turns relative to the trailer, or vice versa, the kingpin control arm 24 is engageable by the side walls 26, 28 of the slot 22 to impart a rotative force on the kingpin which is rotatable relative to both the tractor and the trailer within the slot between the side walls.

The present invention resides in a stabilizing control device 30 associated with the kingpin 14 as hereinafter described and fixedly mounted on the wear plate 16 of the trailer by suitable fastening means which may take the form of ears 32 fixed to the wear plate as by welding. In the illustrative embodiment, the control device comprises a housing means of annular configuration and formed by at bottom plate 38, an intermediate ring 40, and a top plate 42 which are secured by suitable fastening means 44.

An annular chamber 46 is provided within the housing means by a flat surface 48 on the top plate, an annular side surface 50 on the ring, and an annular surface 52 on the bottom plate. Centrally located kingpin openings 54, 56 are provided in the top and bottom plates, respectively. The kingpin extends from beneath the wear plate through an opening 58 therein and through the opening 56 which may include a seal or packing 60. The kingpin extends within the housing means and through the chamber 46 thereby forming an inner annular wall 62 of the chamber. The kingpin is rotatably supported relative to the housing means by suitable fastening means 64 which may take the form of a reduced diameter threaded stub shaft portion extending through the opening 54 in the top plate and held against axial displacement by a threaded nut and washer.

The chamber 46 is divided into two variable volume chambers by a fixed abutment means 66 and a movable abutment means 67. The fixed abutment means is centrally located on the longitudinal line of pull 71 of the hitch and provides circumferentially offset radially extending side abutment surfaces 68, 70 which extend between the chamber walls 50, 62. In the illustrative embodiment, the abutment means 66 is shown to be a separate part fixedly attached to the rung 40 by suitable fastening means 72, 74, 75 but it is to be understood that it may be otherwise secured or integral with the housing. Movable abutment means 67 is fixedly secured to the kingpin by suitable fastening means 78, 80 and key means 82 but it also may be otherwise secured or integral with the kingpin. The movable abutment means 76 extends generally radially toward the side wall 50 of the chamber 46 and terminates in radially spaced relationship to the side wall to define a restricted flow passage 84 therebetween. The movable abutment means 76 is located opposite the control arm 24 so that when the control arm is in a neutral or centrally located position in alignment with the longitudinal line of pull 71, the arrangement is such that the fixed abutment 66, the movable abutment 76, the control arm 24, and the center of the kingpin hole and slot 22 are centrally aligned along the line of pull which condition will occur when the longitudinal axis of the trailer and tractor are aligned. Thus, in the neutral position the abutment means 66, 76 divide the chamber 46 into equal size compartments 86, 88 which are connected by the restricted opening 84 and inversely variable in volume as the movable abutment means is moved circumferentially.

In order to stabilize the relative movements between the tractor and the trailer, energy input responsive means are provided to respond to all forces tending to cause undesirable relative movements, particularly those caused by sudden changes in relative positions under heavy loads. For this purpose, a solid relatively incompressible resilient elastic flowable rubber-like material is placed in the chamber 46 and extends circumferentially therein between the fixed abutment surfaces 68, 70 and radially throughout the chamber between the surfaces 46, 62. In the illustrative embodiment, the material is formed into two identical blocks 90, 92 which completely fill the compartments 86, 88 with radially extending side surfaces at one end abutting the radially extending side surfaces 68, 70 of the fixed abutment means and radially extending side surfaces at the other end abutting one another in the restricted passage at 94 along the line of pull.

It is contemplated that the illustrative shape of the movable abutment, and hence the restricted passage and the rubber blocks, may be varied as necessary or desirable to obtain different operating characteristics. Also, the rubber blocks may be made of rubber-like synthetic materials such as various silicone materials, etc., and may take various forms, i.e., integral, one piece or further separated into additional segments. In some instances it may be desirable to provide additional flow passages in, for example, the side wall 46 or the fixed abutment 66 or even in the rubber material itself. The rubber-like material may be a natural or synthetic rubber or plastic material. A rubber material having a durometer of 50 has proved to be satisfactory and a 10–180 durometer range is probably suitable.

As the kingpin 14 rotates, the incompressible rubber material in the chamber being reduced in volume is squeezed and caused to flow through the restricted passage into the adjacent chamber being increased in volume. Since the rubber material is incompressible, relative movement between the connected units is dependent upon flow of the rubber material through the restricted passage as the volume of the variable volume chamber decreases. The rate of relative movement between the connected units will be dependent upon the rate of flow of the rubber material through the restricted passage. It appears that the rate of flow of the rubber material will be dependent upon resistance to flow which will be a function of (1) the amount of the restriction, (2) frictional characteristics, (3) internal and surface resistance to deformation, (4) pressure, and (5) flow velocity. For example, if a sudden large force is applied to the rubber, its rate of flow will not increase proportionately and it will act as a brake on relative movement between the two units and thereby tend to stabilize the movements. On the other hand, if slow steady pressure is exterted on the rubber enough of it can be caused to flow through the restricted passage to enable all normal movements between the tractor and trailer to be effectuated. Thus, the resistance, R, appears to be equal to the force applied, F, divided by the rate of force application or time, T, which may be expressed as $R=F/T^2$.

Also solid rubber-like material appears to act like a hydraulic fluid whose rate of flow through an orifice may be measured by $$Q = K \times Dc \times D^2 \times \sqrt{\frac{P}{S}}$$

where K is a flow constant equal to 29.81 for liquids, Dc is the coefficient of discharge, $D^2$ is the orifice diameter squared, P is the pressure, and S is the specific gravity. It appears that the solid rubber-like material acts in the same general manner.

Among the many advantages of the present invention is the elimination of leakage problems and the necessity for highly accurate machining of parts in a hydraulic system. Furthermore, the cost of the rubber is small and the effective volume will not vary. The device is tamper proof and is not subject to failure because of abuse in use on the road.

Since the inventive principles may take various forms and be variously applied, it is intended that the appended claims be construed to include alternative embodiments and applications except insofar as limited by the prior art.

What is claimed is:

1. A stabilizer safety device for tractor-trailer vehicles for resisting sudden forces tending to cause the tractor-trailer vehicle to jackknife, comprising:

pin means for connecting the tractor to the trailer, first load transfer means between the pin means and the tractor to transfer rotative forces therebetween, second load transfer means between the pin means and the trailer to transfer rotative forces therebetween, a mass of incompressible solid flowable rubber-like material mounted in force transfer relationship with said pin means, chamber means confining said mass of incompressible solid flowable rubber-like material, restricted flow passage means connected to said chamber means and causing flow of said mass of incompressible solid flowable rubber-like material therethrough upon application of rotative force on said pin means, and means including said mass of incompressible solid flowable rubber-like material and said chamber means and said restricted flow passage means restricting flow through said restricted flow passage means to provide a restraining force on said pin means directly proportional to the amount and inversely proportional to the square of the rate of application of load transferred therethrough.

2. A stabilizer safety device for tractor-trailer vehicles for resisting sudden forces tending to cause the tractor-trailer vehicle to jackknife, comprising:

pin means for connecting the tractor to the trailer, first load transfer means between the pin means and the tractor to transfer rotative forces therebetween, second load transfer means between the pin means and the trailer to transfer rotative forces therebetween, a mass of incompressible solid flowable rubber-like material mounted in force transfer relationship with said pin means, chamber means confining said mass of incompressible solid flowable rubber-like material, and restricted flow passage means connected to said chamber means and causing flow of said mass of incompressible solid flowable rubber-like material therethrough upon application of rotative force on said pin means, said chamber means comprising:

a generally annular chamber, a centrally located pin opening extending into said chamber, said pin means extending axially through said pin opening and said chamber, a fixed abutment means extending generally radially in said chamber and terminating closely adjacent said pin, a rotatable abutment means fixedly attached to said pin means and being rotatable therewith and extending generally radially in said chamber toward said housing and terminating in radially spaced relationship relative thereto to provide restricted flow passage means therebetween, said fixed abutment means and said movable abutment means being located opposite one another and dividing said chamber into equal compartments in a no load condition, and the mass of incompressible solid flowable rubber-like material filling said chamber and said compartments and said restricted flow passage and acting like a hydraulic fluid therewithin.

3. The invention as defined in claim 2 and wherein said movable abutment means has a curved peripheral side surface abutting said solid flowable rubber-like material.

4. The invention as defined in claim 2 and wherein said solid rubber-like material is formed from multiple segments.

5. The invention as defined in claim 4 and wherein there are two segments of solid rubber-like material.

6. The invention as defined in claim 5 and wherein the segments each fill one compartment.

7. The invention as defined in claim 6 and wherein the segments abut one another in said restricted flow passage.

8. The invention as defined in claim 7 and wherein said movable abutment means has a curved peripheral side surface, each of said segments having a correspondingly curved peripheral side surface portion in abutting engagement with said curved peripheral side sruface of said movable abutment means.

9. The invention as defined in claim 3 and said solid flowable rubber-like material having a portion adjacent said restricted flow passage with a correspondingly curved peripheral side surface abutting said curved peripheral side surface of said solid flowable rubber-like material.

10. A stabilizer safety device for tractor-trailer vehicles for resisting sudden forces tending to cause the tractor-trailer vehicle to jackknife, comprising:

pin means for connecting the tractor to the trailer, first load transfer means between the pin means and the tractor to transfer rotative forces therebetween, second load transfer means between the pin means and the trailer to transfer rotative forces therebetween, a mass of incompressible solid flowable rubber-like material mounted in force transfer relationship with said pin means, chamber means confining said mass of incompressible solid flowable rubber-like material, and restricted flow passage means connected to said chamber means and causing flow of said mass of incompressible solid flowable rubber-like material therethrough upon application of rotative force on said pin means, said chamber means comprising:
fixed abutment means providing radially spaced abutment surfaces,
rotatable abutment means fixedly attached to said pin means and being rotatable thereby between said spaced abutment surfaces,
said fixed abutment means and said movable abutment means dividing said chamber into equal compartments in a no-load condition, and the mass of incompressible solid flowable rubber-like material filling said chamber and said compartments and said restricted flow passage and acting like a hydraulic fluid therewithin.

References Cited

UNITED STATES PATENTS

| | | | |
|---|---|---|---|
| 1,652,254 | 12/1927 | Schlagenhauf. | |
| 2,503,143 | 4/1950 | Wasdell | 188—88 |
| 2,170,898 | 8/1939 | Humphrey | 280—432 |
| 2,692,146 | 10/1954 | Black | 280—432 |
| 3,420,548 | 1/1969 | Wakeman | 280—432 |
| 3,439,936 | 4/1969 | Hines | 280—432 |

LEO FRIAGLIA, Primary Examiner

U.S. Cl. X.R.

188—93